(12) United States Patent
Maeda et al.

(10) Patent No.: US 10,998,537 B2
(45) Date of Patent: May 4, 2021

(54) BATTERY (71) Applicant: Panasonic Intellectual Property Management Co., Ltd., Osaka (JP)

(72) Inventors: Hitoshi Maeda, Hyogo (JP); Yoshitaka Shinyashiki, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/749,561

(22) PCT Filed: Aug. 23, 2016

(86) PCT No.: PCT/JP2016/003821
§ 371 (c)(1),
(2) Date: Feb. 1, 2018

(87) PCT Pub. No.: WO2017/038044
PCT Pub. Date: Mar. 9, 2017

(65) Prior Publication Data
US 2018/0226626 A1    Aug. 9, 2018

(30) Foreign Application Priority Data
Aug. 31, 2015    (JP) .............................. JP2015-170809

(51) Int. Cl.
*H01M 2/26* (2006.01)
*H01M 2/30* (2006.01)
(Continued)

(52) U.S. Cl.
CPC .............. *H01M 2/266* (2013.01); *H01M 2/30* (2013.01); *H01M 10/0525* (2013.01); *H01M 10/0585* (2013.01)

(58) Field of Classification Search
CPC ..... H01M 2/266; H01M 2/30; H01M 10/0525
See application file for complete search history.

(56) References Cited

U.S. PATENT DOCUMENTS

| 8,637,182 B2* | 1/2014 | Cho ................. H01M 10/0431 429/163 |
| 2003/0031923 A1* | 2/2003 | Aoshima ............... H01M 2/021 429/127 |

(Continued)

FOREIGN PATENT DOCUMENTS

| CN | 101262046 A | 9/2008 |
| JP | 2001-210303 A | 8/2001 |

(Continued)

OTHER PUBLICATIONS

International Search Report dated Oct. 4, 2016, issued in counterpart application No. PCT/JP2016/003821. (2 pages).

(Continued)

*Primary Examiner* — Helen Oi K Conley
(74) *Attorney, Agent, or Firm* — Westerman, Hattori, Daniels & Adrian, LLP (57) ABSTRACT

A battery includes a stacked electrode body including a plurality of single plate cells and having a positive electrode lead-stacked part and a negative electrode lead-stacked part, the single plate cells each being formed by stacking a positive electrode and a negative electrode with a separator interposed therebetween, the positive electrode lead-stacked part being formed by stacking positive electrode leads of the positive electrodes on top of each other in stacking order of the single plate cells, the negative electrode lead-stacked part being formed by stacking negative electrode leads of the negative electrodes on top of each other in stacking order of the single plate cells; a positive electrode terminal; and a negative electrode terminal.

1 Claim, 8 Drawing Sheets (51) Int. Cl.
*H01M 10/0585* (2010.01)
*H01M 10/0525* (2010.01)

(56) References Cited

U.S. PATENT DOCUMENTS

| | | |
|---|---|---|
| 2008/0060189 A1 | 3/2008 | Daidoji et al. |
| 2008/0217078 A1 | 9/2008 | Kobayashi et al. |
| 2009/0317717 A1 | 12/2009 | Ryu et al. |
| 2011/0171516 A1* | 7/2011 | Byun .................... H01M 2/263 429/161 |
| 2013/0143109 A1* | 6/2013 | Kim ........................ H01M 2/30 429/178 |

FOREIGN PATENT DOCUMENTS

| | | |
|---|---|---|
| JP | 2004-31195 A | 1/2004 |
| JP | 2008-27894 A | 2/2008 |
| JP | 2008-66170 A | 3/2008 |
| JP | 2012-204305 A | 10/2012 |
| JP | 2015-225736 A | 12/2015 |

OTHER PUBLICATIONS

Office Action dated Nov. 5, 2019, issued in counterpart JP application No. 2017-537218, with English translation. (6 pages).
English Translation of Chinese Search Report dated Dec. 25, 2020, issued in counterpart CN Application No. 201680042964.X. (2 pages).

\* cited by examiner

BATTERY

TECHNICAL FIELD

The present disclosure relates to batteries.

BACKGROUND ART

In the related art, there is known a battery having a stacked electrode body including a plurality of single plate cells each formed by stacking a positive electrode and a negative electrode with a separator interposed therebetween (hereinafter, this battery may be referred to as a "stacked battery"). In a stacked battery known in the art, a pair of lead stacked bodies including pairs of electrode plate leads stacked on top of each other in stacking order of the single plate cells are simply connected to the corresponding electrode terminals while the stacking order of the electrode plate leads is maintained (see, for example, Patent Literature 1). Here, the term "single plate cell" refers to a battery unit including one positive electrode and one negative electrode. In other words, the stacked electrode body has a connection structure in which a plurality of single plate cells is connected to electrode terminals in parallel.

CITATION LIST

Patent Literature

PTL 1: Japanese Published Unexamined Patent Application No. 2008-66170

SUMMARY OF INVENTION

Technical Problem

There is a multilayer technique for increasing the number of stacked electrodes in order to increase the capacity of stacked batteries. However, a larger number of stacked electrodes results in a larger number of stacked electrode plate leads in each lead stacked body. Thus, many electrode plate leads are interposed between an electrode terminal and an electrode plate lead distant from the electrode terminal, which increases the connection resistance between the electrode terminal and the electrode plate lead. The connection resistance between the electrode terminal and an electrode plate lead near the electrode terminal is low.

In a stacked battery known in the art, as described above, the single plate cells included in the stacked electrode body exhibit different resistances for connection to the electrode terminals. Such different resistances result in variations in the utilization rate of the single plate cells to degrade cycle characteristics. As the number of stacked electrodes increases, such an issue becomes more serious.

Solution to Problem

A battery according to the present disclosure includes a stacked electrode body including a plurality of single plate cells and having a positive electrode lead-stacked part and a negative electrode lead-stacked part, the single plate cells each being formed by stacking a positive electrode and a negative electrode with a separator interposed therebetween, the positive electrode lead-stacked part being formed by stacking positive electrode leads of the positive electrodes on top of each other in stacking order of the single plate cells, the negative electrode lead-stacked part being formed by stacking negative electrode leads of the negative electrodes on top of each other in stacking order of the single plate cells; a positive electrode terminal to which the positive electrode lead-stacked part is connected; and a negative electrode terminal to which the negative electrode lead-stacked part is connected. Among the positive electrode leads that constitute the positive electrode lead-stacked part, a first end-side positive electrode lead located at a first end in the single plate cell-stacking direction of the stacked electrode body is directly connected to the positive electrode terminal. Among the negative electrode leads that constitute the negative electrode lead-stacked part, a second end-side negative electrode lead located at a second end in the single plate cell-stacking direction is directly connected to the negative electrode terminal.

Advantageous Effects of Invention

According to one aspect of the present disclosure, there is provided a battery that has good cycle characteristics and in which single plate cells in a stacked electrode body exhibit small variations in utilization rate.

DESCRIPTION OF EMBODIMENTS

Batteries according to exemplary embodiments will be described below in detail.

The drawings to which reference is made in the description of the embodiments are schematically illustrated. The dimensional ratios and the like of components in the drawings may be different from actual dimensional ratios and the like. Specific dimensional ratios and the like should be determined in light of the following description. As used therein, the term "substantially" is intended to describe substantially the same feature as an example and include completely the same feature and substantially the same feature. The term "end portion" refers to an end and its surroundings of an object. The term "shape in sectional view" refers to the cross-sectional shape illustrated in the sectional view to which reference is made. When the shape in sectional view is identical to the shape in side view, description may be given using one or both of these phrases.

A laminate-type battery including an outer body composed of two laminate films is illustrated in embodiments. However, the battery according to the present disclosure is not limited to this type of battery. The battery according to the present disclosure may be a battery including as an outer body, for example, a metal case of a prismatic shape, a coin shape, or other shapes.

Figure 1:
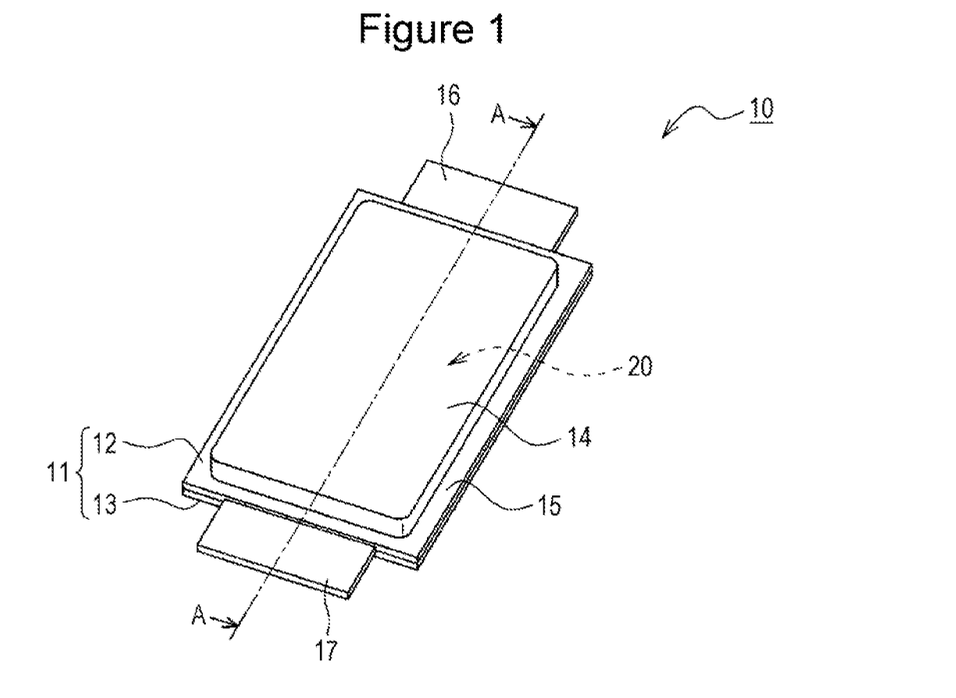
FIG. 1 is a perspective view of the appearance of a battery according to a first embodiment.
Figure 2:
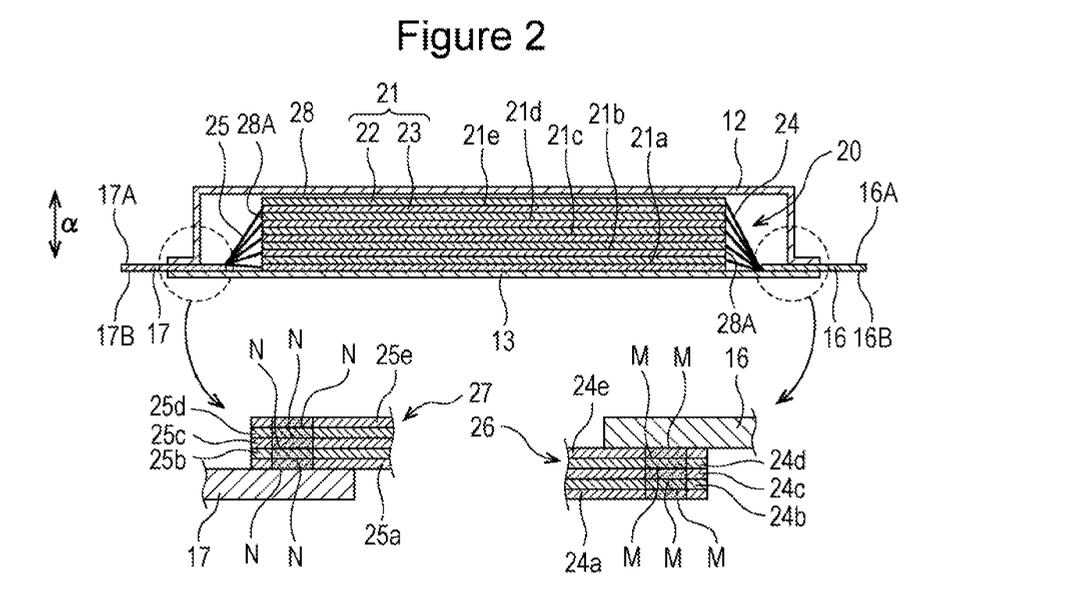
FIG. 2 is a sectional view taken along line A-A in FIG. 1.

Referring to FIG. 1 to FIG. 5, a battery 10 according to an exemplary embodiment (first embodiment) will be described below. FIG. 1 is a perspective view of the appearance of the battery 10. FIG. 2 is a sectional view taken along line A-A in FIG. 1 and includes enlarged connection areas between the lead stacked parts and the corresponding electrode terminals. In the following description, the laminate film 12 side of an outer body 11 is regarded as the upper side, and the laminate film 13 side is regarded as the lower side for convenience of description.

As illustrated in FIG. 1 and FIG. 2, the battery 10 includes a stacked electrode body 20 including a plurality of single plate cells 21 each formed by stacking a positive electrode 22 and a negative electrode 23 with a separator (not shown) interposed therebetween. The single plate cell 21 is a battery unit including one positive electrode 22 and one negative electrode 23. The stacked electrode body 20 has a stacked structure in which the single plate cells 21 are stacked on top of each other. For example, a tape for preventing stacking misalignment of the single plate cells 21 located between the opposite end portions in the single plate cell-stacking direction $\alpha$ is attached to the electrode body. The stacked electrode body 20 includes a positive electrode lead-stacked part 26 formed by stacking positive electrode leads 24 of the positive electrodes 22 on top of each other in stacking order of the single plate cells 21, and a negative electrode lead-stacked part 27 formed by stacking negative electrode leads 25 of the negative electrodes 23 on top of each other in stacking order of the single plate cells 21.

FIG. 2 illustrates five single plate cells 21 included in the stacked electrode body 20, but the number of stacked single plate cells 21 is not limited. The number of stacked single plate cells 21 is, for example, 20 or more and preferably 20 to 70. In this embodiment, the number of positive electrodes 22 is equal to the number of negative electrodes 23, and the number of positive electrode leads 24 is equal to the number of negative electrode leads 25 (hereinafter, these electrode leads are collectively referred to as "electrode plate leads"). The stacked electrode body 20 includes one positive electrode lead-stacked part 26 and one negative electrode lead-stacked part 27. Each lead stacked body includes the same number of electrode plate leads.

The battery 10 includes a positive electrode terminal 16 to which the positive electrode lead-stacked part 26 is connected; and a negative electrode terminal 17 to which the negative electrode lead-stacked part 27 is connected. In the positive electrode lead-stacked part 26, the positive electrode leads 24 are electrically connected to one another in stacking order of the single plate cells 21. In the negative electrode lead-stacked part 27, the negative electrode leads 25 are electrically connected to one another in stacking order of the single plate cells 21. In other words, the stacked electrode body 20 has a connection structure in which a plurality of single plate cells 21 is connected to the electrode terminals in parallel via a plurality of electrode plate leads. Bonding between the electrode plate leads in each lead stacked part and bonding between each lead stacked part and each electrode terminal are performed by, for example, welding in a state in which a plurality of electrode plate leads are stacked on the electrode terminal. The welding method is preferably, but not necessarily, ultrasonic welding or laser welding. In FIG. 2, the welded zones are indicated by the dots.

As described below in detail, among the positive electrode leads 24 that constitute the positive electrode lead-stacked part 26, a first end-side positive electrode lead (positive electrode lead 24e) located at a first end in the single plate cell-stacking direction $\alpha$ is directly connected to the positive electrode terminal 16. Among the negative electrode leads 25 that constitute the negative electrode lead-stacked part 27, a second end-side negative electrode lead (negative electrode lead 25a) located at a second end in the single plate cell-stacking direction $\alpha$ is directly connected to the negative electrode terminal 17.

The positive electrodes 22, the negative electrodes 23, and the separators in the stacked electrode body 20 each has, for example, a substantially rectangular shape in plan view. A body part 28 of the stacked electrode body 20 has a substantially rectangular parallelepiped shape. The body part 28 refers to a part of the stacked electrode body 20 excluding the lead stacked parts. In the structure illustrated in FIG. 1 and FIG. 2, the positive electrode leads 24 and the negative electrode leads 25 extend from the corresponding side surfaces 28A that reside in the single plate cell-stacking direction $\alpha$ and which are located at the opposite ends of the body part 28 in the longitudinal direction. In other words, pairs of electrode plate leads extend in opposite directions.

The positive electrode leads 24 are stacked on top of each other in stacking order of the single plate cells 21 to form the positive electrode lead-stacked part 26 at least in a part where the positive electrode leads 24 are connected to the positive electrode terminal 16. The negative electrode leads 25 are stacked on top of each other in stacking order of the single plate cells 21 to form the negative electrode lead-stacked part 27 at least in a part where the negative electrode leads 25 are connected to the negative electrode terminal 17. The electrode plate leads may overlap each other from near the side surfaces 28A to form the respective lead stacked parts. The thickness of each electrode plate lead is, for example, 20 μm or less and preferably 5 μm to 20 μm.

A suitable example of the battery 10 is a lithium ion battery, which includes the stacked electrode body 20 serving as a power generating element and a non-aqueous electrolyte. In this embodiment, the outer body 11 composed of the laminate films 12 and 13 houses the power generating element. The laminate films 12 and 13 are preferably each formed of a film including a metal layer and a resin layer on each surface of the metal layer. One of the resin layers is preferably made of a resin that can be thermally compressed. The metal layer is, for example, a thin layer made of aluminum and has a function of preventing penetration of liquid and the like.

The outer body 11 has, for example, a substantially rectangular shape in plan view. The outer body 11 has a body part 14 having a space for the power generating element, and a seal part 15 extending from the periphery of the body part 14. In the example illustrated in FIG. 1, the laminate film 12 is formed in a cup shape, and the body part 14 having a flat and substantially rectangular parallelepiped shape is formed in the film. The body part 14 is formed such that the laminate film 12 is drawn to protrude on the side opposite to the opposed laminate film 13. The laminate film 13 is substantially flat and forms the bottom surface of the battery 10. The seal part 15 is formed at the periphery of the body part 14, for example, by thermocompression between the margins of the laminate films 12 and 13, so that the seal part 15 seals the space for the body part 14.

In the structure illustrated in FIG. 1 and FIG. 2, the positive electrode terminal 16 and the negative electrode terminal 17 extend from the corresponding ends of the outer body 11 in the longitudinal direction. In other words, a pair of electrode terminals extend in opposite directions. The positive electrode terminal 16 and the negative electrode terminal 17 each have a substantially flat plate shape and extend substantially perpendicular to the single plate cell-stacking direction α. The positive electrode terminal 16 and the negative electrode terminal 17 are bonded to the laminate films 12 and 13 at the seal part 15, pass through the seal part 15, and extend outward of the outer body 11 from between the films. Each electrode terminal is located on the laminate film 13 and disposed substantially parallel to the plane direction of the film.

The positive electrode 22 includes, for example, a positive electrode current collector and a positive electrode mixture layer formed on the current collector. The positive electrode current collector is, for example, a foil made of a metal, such as aluminum, stable in the potential range of the positive electrode 22 or a film having the surface layer made of the metal. Each positive electrode lead 24 is formed such that, for example, part of the positive electrode current collector projects in the longitudinal direction of the positive electrode 22, so that each positive electrode lead 24 is integrated with the current collector. The positive electrode mixture layer preferably contains a conductive material and a binding material in addition to a positive electrode active material. The positive electrode mixture layer is preferably formed on each surface of the current collector. The positive electrode 22 can be produced by, for example, applying a positive electrode mixture slurry containing a positive electrode active material, a binding material, and the like to the positive electrode current collector and drying the coating films, followed by rolling to form a positive electrode mixture layer on each surface of the current collector.

The positive electrode active material is, for example, a lithium-containing composite oxide. The lithium-containing composite oxide is preferably, but not necessarily, a composite oxide represented by general formula $Li_{1+x}M_aO_{2+b}$ (where x+a=1, −0.2<x≤0.2, −0.1≤b≤0.1, and M includes at least one of Ni, Co, Mn, and Al). Examples of suitable composite oxides include lithium composite oxides containing Ni, Co, Mn; and lithium-containing composite oxides containing Ni, Co, Al.

The negative electrode 23 includes, for example, a negative electrode current collector and a negative electrode mixture layer formed on the current collector. The negative electrode current collector may be formed of, for example, a foil made of a metal, such as copper, stable in the potential range of the negative electrode 23 or a film having the surface layer made of the metal. Each negative electrode lead 25 is formed such that, for example, part of the negative electrode current collector projects in the longitudinal direction of the negative electrode 23, so that each negative electrode lead 25 is integrated with the current collector. The negative electrode mixture layer preferably includes a binding material in addition to a negative electrode active material. The negative electrode 23 can be produced by, for example, applying a negative electrode mixture slurry containing a negative electrode active material, a binding material, and the like to the negative electrode current collector and drying the coating films, followed by rolling to form a negative electrode mixture layer on each surface of the current collector.

The negative electrode active material is any material that can intercalate and deintercalate lithium ions and is typically graphite. The negative electrode active material may be silicon, a silicon compound, or a mixture of these, or may be a combination of a silicon compound or the like and a carbon material, such as graphite. Examples of suitable silicon compounds include silicon oxides represented by $SiO_x$ (0.5≤x≤1.5).

The non-aqueous electrolyte contains a non-aqueous solvent and an electrolyte salt dissolved in the non-aqueous solvent. The non-aqueous electrolyte is not limited to a liquid electrolyte and may be a solid electrolyte containing a gel polymer or the like. Examples of the non-aqueous solvent include esters, ethers, nitriles, amides, and mixtures of two or more of these solvents. The non-aqueous solvent may contain a halogenated product formed by substituting at least part of hydrogen atoms of such a solvent with halogen atoms, such as a fluorine atom. The electrolyte salt is preferably a lithium salt.

Figure 3:
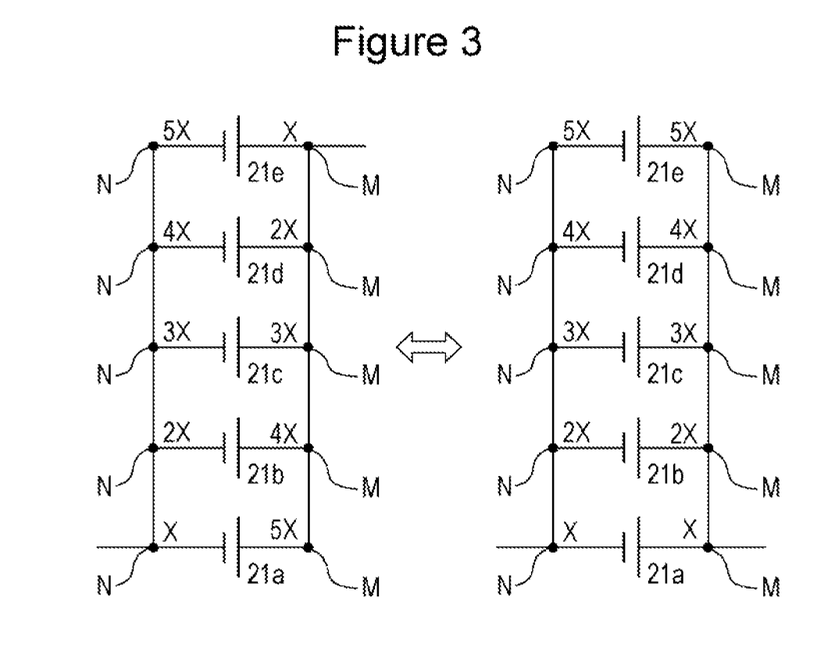
FIG. 3 is a circuit diagram of the connection form between electrode plate leads and electrode terminals in the battery according to the first embodiment.

Referring to FIG. 2 and FIG. 3, the connection form between electrode plate leads and electrode terminals will be further described below in detail. FIG. 3 is a circuit diagram of the connection form between electrode plate leads and electrode terminals.

In the stacked electrode body 20, as illustrated in FIG. 2, single plate cells 21a, 21b, 21c, 21d, and 21e are stacked in order of increasing distance from the electrode terminals (sequentially from bottom in this embodiment). In FIG. 2, the electrode plate leads corresponding to these single plate cells 21 are provided with a, b, c, d, and e, respectively. The positive electrode lead-stacked part 26 is formed by staking positive electrode leads 24a, 24b, 24c, 24d, and 24e sequentially from bottom in stacking order of the single plate cells 21. Similarly, the negative electrode lead-stacked part 27 is formed by staking the negative electrode leads 25a, 25b, 25c, 25d, and 25e sequentially from bottom in stacking order of the single plate cells 21.

The positive electrode lead-stacked part 26 is located between the laminate film 13 and the positive electrode terminal 16 and is connected to a second surface 16B that faces the laminate film 13 (faces downward). The positive electrode lead 24e located at a first end (top end) of the positive electrode lead-stacked part 26 in the single plate cell-stacking direction α is directly connected to the second surface 16B of the positive electrode terminal 16. There is one connection interface M at least in a welded zone between the positive electrode terminal 16 and the positive electrode lead 24e of the single plate cell 21e stacked at the top end of the stacked electrode body 20.

Meanwhile, there are two connection interfaces M between the positive electrode terminal 16 and the positive electrode lead 24d of the single plate cell 21d, which is stacked second from top, of the stacked electrode body 20 because the positive electrode lead 24e is interposed between the positive electrode terminal 16 and the positive electrode lead 24d. There are three connection interfaces M between the positive electrode lead 24c and the positive electrode terminal 16, four connection interfaces M between the positive electrode lead 24b and the positive electrode terminal 16, and five connection interfaces M between the positive electrode lead 24a and the positive electrode terminal 16.

The negative electrode lead-stacked part 27 is connected to a first surface 17A of the negative electrode terminal 17 that faces the laminate film 12 (faces upward). The negative electrode lead 25a located at a second end (bottom end) of the negative electrode lead-stacked part 27 in the single plate cell-stacking direction α is directly connected to the first surface 17A of the negative electrode terminal 17. There is one connection interface N at least in a welded zone between the negative electrode terminal 17 and the negative electrode lead 25a of the single plate cell 21a stacked at the bottom end of the stacked electrode body 20.

Meanwhile, there are two connection interfaces N between the negative electrode terminal 17 and the negative electrode lead 25b of the single plate cell 21b, which is stacked second from bottom, of the stacked electrode body 20 because the negative electrode lead 25a is interposed between the negative electrode terminal 17 and the negative electrode lead 25b. There are three connection interfaces N between the negative electrode lead 25c and the negative electrode terminal 17, four connection interfaces N between the negative electrode lead 25d and the negative electrode terminal 17, and five connection interfaces N between the negative electrode lead 25e and the negative electrode terminal 17.

In other words, the stacking order of the electrode plate leads with respect to the electrode terminal on the positive electrode 22 side is opposite to that on the negative electrode 23 side. For example, for the single plate cell 21a, the negative electrode lead 25a in the negative electrode lead-stacked part 27 is the closest to the negative electrode terminal 17 so that the connection distance therebetween is the shortest; the positive electrode lead 24a in the positive electrode lead-stacked part 26 is the farthest from the positive electrode terminal 16 so that the connection distance therebetween is the longest. For the single plate cell 21e, the positive electrode lead 24e in the positive electrode lead-stacked part 26 is the closest to the positive electrode terminal 16 so that the connection distance therebetween is the shortest; the negative electrode lead 25e in the negative electrode lead-stacked part 27 is the farthest from the negative electrode terminal 17 so that the connection distance therebetween is the longest. For the single plate cell 21c stacked in the middle of the single plate cells 21, the connection distance on the positive electrode 22 side is equal to that on the negative electrode 23 side.

In this embodiment, the total number (m+n) of the number (m) of connection interfaces M between each positive electrode lead 24 and the positive electrode terminal 16 and the number (n) of connection interfaces N between each negative electrode lead 25 and the negative electrode terminal 17 is the same for each single plate cell 21 included in the stacked electrode body 20, as described below. As described above, for the single plate cell 21a, the number (m) of connection interfaces between the positive electrode lead 24a and the positive electrode terminal 16 is 5, the number (n) of connection interfaces between the negative electrode lead 25a and the negative electrode terminal 17 is 1, and the total number (m+n) is 6. The number of connection interfaces (m, n) and the total number (m+n) for other single plate cells 21 are as described below.

Single plate cell 21b; m=4, n=2, m+n=6
Single plate cell 21c; m=3, n=3, m+n=6
Single plate cell 21d; m=2, n=4, m+n=6
Single plate cell 21e; m=1, n=5, m+n=6

Alternatively, the connection form in which the total number (m+n) is different for each single plate cell 21 may be used. For example, the total number (m+n) can be made different for each single plate cell in such a manner that plural positive electrode lead-stacked parts 26 and plural negative electrode lead-stacked parts 27 each including a different number of stacked electrode plate cells are formed and connected to the corresponding electrode terminals.

When plural positive electrode lead-stacked parts 26 and plural negative electrode lead-stacked parts 27 are formed, the connection form in which the total number (m+n) is the same for each single plate cell 21 is preferably used in order to make uniform the utilization rate of the single plate cells.

In FIG. 3, X denotes the connection resistance at each of the connection interfaces M and N. Here, it is assumed that the positive electrode leads 24 and the negative electrode leads 25 have the same resistance, and a constant connection resistance is generated at the connection interfaces M and N. Since the number (m) of connection interfaces between the positive electrode terminal 16 and the positive electrode lead 24a of the single plate cell 21a is 5 in this case, the connection resistance between the single plate cell 21a on the positive electrode side and the positive electrode terminal 16 is 5X (X+X+X+X+X) as shown on the left side of FIG. 3. Since the negative electrode lead 25a is directly connected to the negative electrode terminal 17, the connection resistance between the single plate cell 21a on the negative electrode side and the negative electrode terminal 17 is X. In other words, the sum of the connection resistance between the single plate cell 21a and the positive electrode terminal 16 and the connection resistance between the single plate cell 21a and the negative electrode terminal 17 is 6X (X+5X). The sum of the connection resistances between other single plate cells 21 and the electrode terminals is as described below (sequentially from left, the connection resistance between other single plate cells 21 and the positive electrode terminal 16, the connection resistance between other single plate cells 21 and the negative electrode terminal 17, and the sum of the connection resistances).

Single plate cell 21b; 4X, 2X, 6X
Single plate cell 21c; 3X, 3X, 6X
Single plate cell 21d; 2X, 4X, 6X
Single plate cell 21e; X, 5X, 6X As described above, assuming that the electrode plate leads have the same resistance and a constant connection resistance is generated at the connection interfaces M and N, the sum of the connection resistances between the electrode terminals and each single plate cell 21 included in the stacked electrode body 20 is the same (6X for each single plate cell 21 in the example illustrated in FIG. 3). When the sum of the connection resistances between the electrode terminals and each single plate cell 21 is the same, variations in the utilization rate of the single plate cells 21 can be reduced to improve cycle characteristics. The resistance of each electrode plate lead and the like have a smaller effect on the connection resistance than the number of connection interfaces M and N.

On the right side of FIG. 3, a conventional example in which each of a pair of lead stacked parts is simply connected to the corresponding electrode terminal (each lead stacked part is connected to a first surface of the corresponding electrode terminal) is illustrated. In this case, the sum of the connection resistances between single plate cells and electrode terminals is as described below (sequentially from left, the connection resistance between the single plate cells 21 and the positive electrode terminal 16, the connection resistance between the single plate cells 21 and the negative electrode terminal 17, and the sum of the connection resistances), and the distribution of the connection resistance is generated. As a result, the utilization rate greatly differs for each single plate cell, which results in degraded cycle characteristics.

Single plate cell 21a; X, X, 2X
Single plate cell 21b; 2X, 2X, 4X

Single plate cell 21*c;* 3X, 3X, 6X

Single plate cell 21*d;* 4X, 4X, 8X

Single plate cell 21*e;* 5X, 5X, 10X

Figure 4:
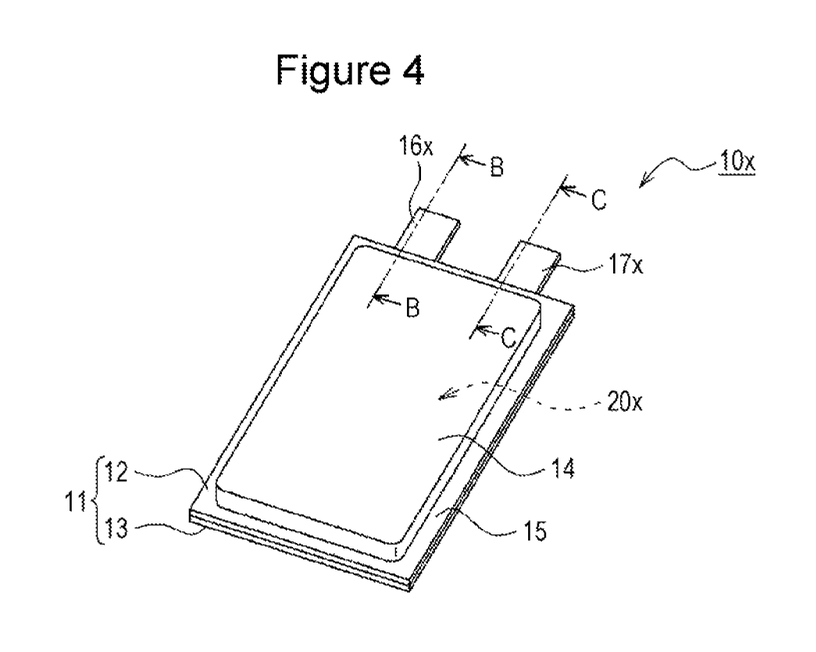
FIG. 4 is a perspective view of the appearance of a battery according to a modification of the first embodiment.
Figure 5:
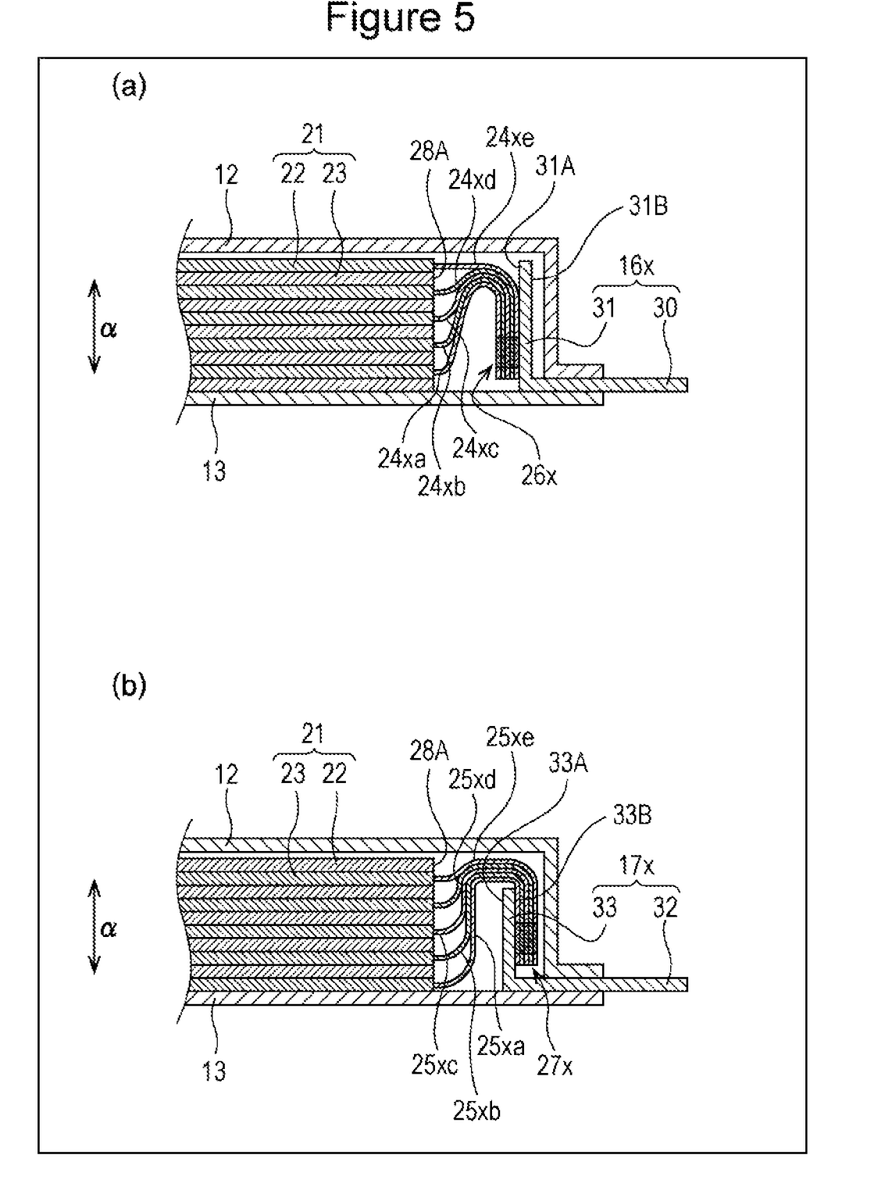
FIG. 5 includes a sectional view (a) taken along line B-B and a sectional view (b) taken along line C-C in FIG. 4.

FIG. 4 and FIG. 5 illustrate a battery 10*x* according to an exemplary embodiment (a modification of the first embodiment). FIG. 4 is a perspective view of the appearance of the battery 10*x*. FIG. 5 includes a sectional view (a) taken along line B-B and a sectional view (b) taken along line C-C in FIG. 4, that is, the cross sections of the battery 10*x* taken in the longitudinal direction of the base parts of the electrode terminals.

As illustrated in FIG. 4, the battery 10*x* differs from the battery 10 in that a pair of electrode terminals extend from an outer body 11 in the same direction. At one end of the outer body 11 in the longitudinal direction, a positive electrode terminal 16*x* extends from one end side of the outer body 11 in the width direction, and a negative electrode terminal 17*x* extends from the other end side of the outer body 11 in the width direction. The positive electrode terminal 16*x* and the negative electrode terminal 17*x* are distant from each other in the width direction of the outer body 11 such that these electrode terminals are not in contact with each other. The positive electrode terminal 16*x* and the negative electrode terminal 17*x* have, for example, substantially the same shape and substantially the same size.

As illustrated in FIG. 5, the positive electrode terminal 16*x* and the negative electrode terminal 17*x* respectively have base parts 30 and 32 located on a laminate film 13 and disposed substantially parallel to the plane direction of the film and respectively have lead connection parts 31 and 33 disposed substantially parallel to the single plate cell-stacking direction α. The base parts 30 and 32 each have one end inside the body part 14 of the outer body 11 and the other end outside the outer body 11. The base parts 30 and 32 each have a middle part bonded to the laminate films 12 and 13 at a seal part 15. The lead connection parts 31 and 33 are parts to which a positive electrode lead-stacked part 26*x* and a negative electrode lead-stacked part 27*x* (electrode plate leads) are connected, respectively. The lead connection parts 31 and 33 are located inside the body part 14. The lead connection parts 31 and 33 are provided at one end of the base parts 30 and 32, respectively. The lead connection part 31 is substantially perpendicular to the base part 30, the lead connection part 33 is substantially perpendicular to the base part 32, and each electrode terminal has a substantially L-shape in sectional view (side view).

In the battery 10*x*, the positive electrode lead-stacked part 26*x* is connected to a first surface 31A of the lead connection part 31, and the negative electrode lead-stacked part 27*x* is connected to a second surface 33B of the lead connection part 33. Each lead stacked part is preferably welded to the corresponding lead connection part. In the example illustrated in FIG. 5, each electrode plate lead has a substantially U-shape protruding upward (part of each electrode plate lead may have a substantially L-shape). Here, the first surface 31A refers to the surface of the lead connection part 31 that faces the side surface 28A; the second surface 33B refers to the surface of the lead connection part 33 that faces away from the side surface 28A.

As in the case of the battery 10, among the positive electrode leads 24*xa* to 24*xe* that constitute the positive electrode lead-stacked part 26*x*, the positive electrode lead 24*xe*, which is a first end-side positive electrode lead located at a first end in the single plate cell-stacking direction α, is directly connected to the positive electrode terminal 16*x* (the first surface 31A of the lead connection part 31). Among the negative electrode leads 25*xa* to 25*xe* that constitute the negative electrode lead-stacked part 27, the negative electrode lead 25*xa*, which is a second end-side negative electrode lead located at a second end in the single plate cell-stacking direction α, is directly connected to the negative electrode terminal 17*x* (the second surface 33B of the lead connection part 33).

In other words, in the battery 10*x*, the stacking order of the electrode plate leads with respect to the electrode terminal on the positive electrode 22 side is also opposite to that on the negative electrode 23 side. Furthermore, the total number (m+n) of the number (m) of connection interfaces and the number (n) of connection interfaces is the same for each single plate cell 21 included in the stacked electrode body 20. According to the battery 10*x*, the sum of the connection resistances between the electrode terminals and each single plate cell 21 is the same, so that variations in the utilization rate of the single plate cells 21 can be reduced to improve cycle characteristics.

In the example illustrated in FIG. 5, the lead stacked parts are respectively connected to the surfaces of the corresponding lead connection parts, the surfaces facing in the opposite directions, but the lead stacked parts may be respectively connected to the surfaces of the corresponding lead connection parts, the surfaces facing in the same direction. For example, it is possible to connect the positive electrode lead-stacked part 26*x* to the first surface 31A of the lead connection part 31 and connect the negative electrode lead-stacked part 27*x* to the first surface 33A of the lead connection part 33. In this case, the negative electrode leads are stacked on top of each other so as to form a substantially U-shape protruding downward, forming the negative electrode lead-stacked part 27*x*. The negative electrode lead 25*xa* is positioned closest to the first surface 33A, and the negative electrode lead 25*xa* is directly connected to the first surface 33A. As a result, the connection form in which the sum of the connection resistances between the electrode terminals and each single plate cell 21 is the same can be obtained.

Figure 6:
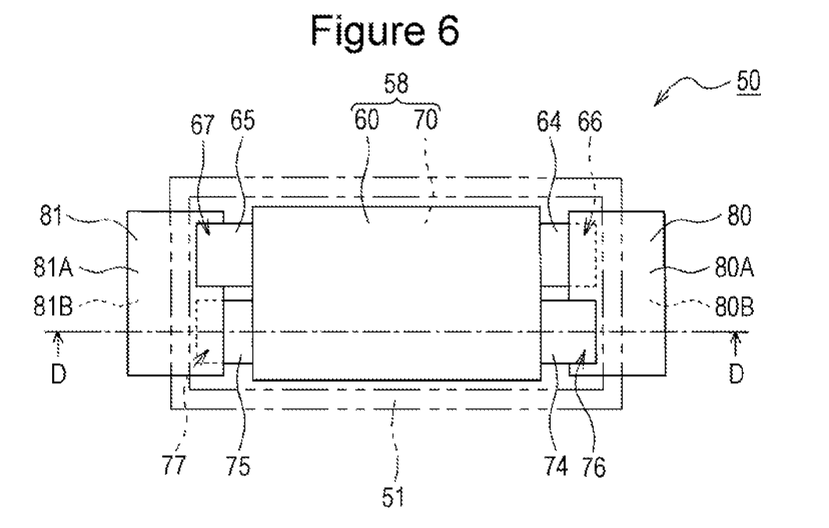
FIG. 6 is a plan view of a battery according to a second embodiment.
Figure 7:
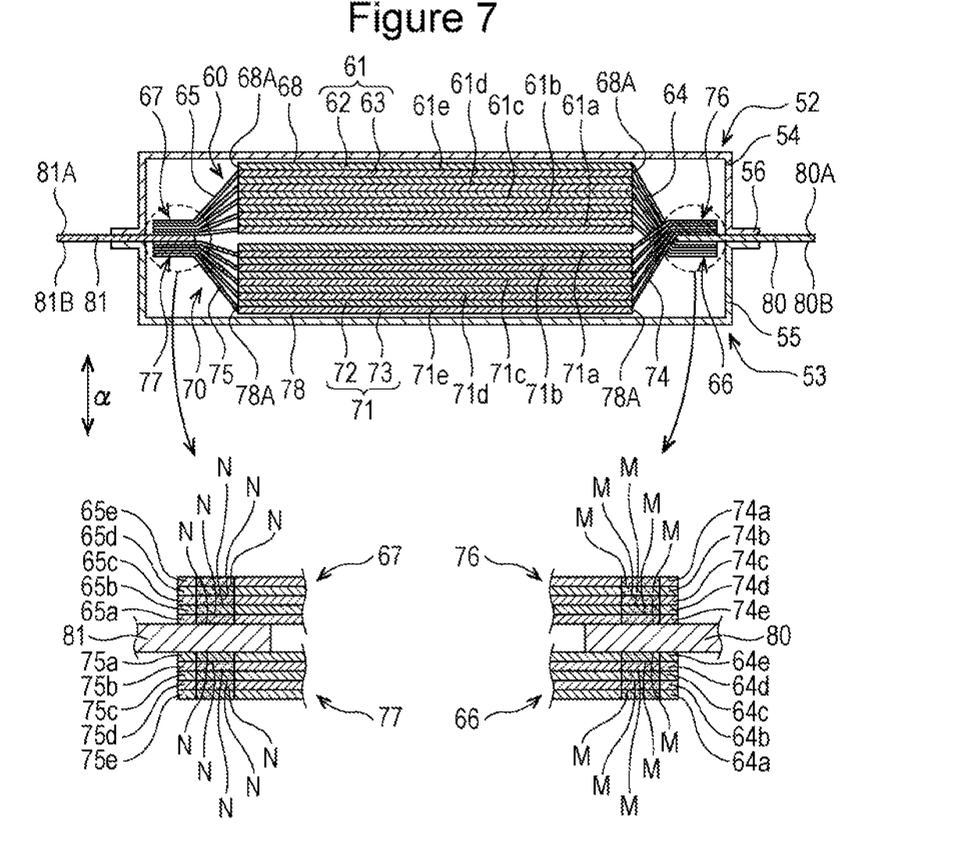
FIG. 7 is a sectional view taken along line D-D in FIG. 6.
Figure 8:
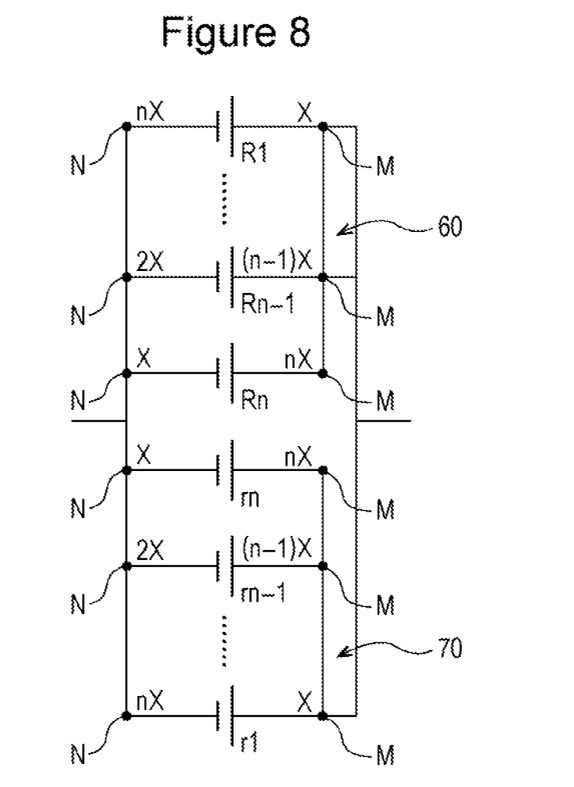
FIG. 8 is a circuit diagram of the connection form between electrode plate leads and electrode terminals in the battery according to the second embodiment.

Referring to FIG. 6 to FIG. 12, a battery 50 according to an exemplary embodiment (second embodiment) will be described below in detail. FIG. 6 is a plan view of the battery 50, where an outer body 51 is indicated by a two-dot chain line. FIG. 7 is a sectional view taken along line D-D in FIG. 6. FIG. 8 is a circuit diagram of the connection form between electrode plate leads and electrode terminals. In the following description, the laminate film 52 side of the outer body 51 is regarded as the upper side, and the laminate film 53 side is regarded as the lower side for convenience of description.

As illustrated in FIG. 6 and FIG. 7, the battery 50 differs from the battery 10 in that the battery 50 has a stacked electrode body 58 including two separate blocks 60 and 70 (first and second blocks). The blocks 60 and 70 are adjacent to each other in the single plate cell-stacking direction α (vertical direction). The blocks 60 and 70 respectively have body parts 68 and 78 (parts excluding the lead stacked parts) with, for example, a substantially rectangular parallelepiped shape. For example, a sheet-shaped insulating member is disposed between the blocks 60 and 70, and no large gap is preferably present therebetween. The insulating member may be a separator used in a single plate cell. The number of blocks that constitute the stacked electrode body 58 is not limited to two and may be three or more.

The battery 50 differs from the battery 10 in that the outer body 51 is composed of two laminate films 52 and 53 each formed in a cup shape. The outer body 51 has body parts 54 and 55 respectively having spaces for the blocks 60 and 70 and has a seal part 56 extending from the peripheries of the body parts 54 and 55. The body parts 54 and 55 each have, for example, a flat and substantially rectangular parallelepiped shape. The body parts 54 and 55 are formed by drawing the laminate films 52 and 53 to protrude in opposite directions. The laminate films 52 and 53 can be the same films as the laminate films 12 and 13.

The battery 50 is, for example, a lithium ion battery. A positive electrode 62 and a negative electrode 63 in each of single plate cells 61 in the block 60 and a positive electrode 72 and a negative electrode 73 in each of single plate cells 71 in the block 70, a non-aqueous electrolyte, and the like can be made of the same materials as those in the battery 10.

In this embodiment, the blocks 60 and 70 include the same number of single plate cells 61 and 71, respectively. In the block 60, single plate cells 61a, 61b, 61c, 61d, and 61e are stacked in order of increasing distance from each electrode terminal (sequentially from bottom). In the block 70, single plate cells 71a, 71b, 71c, 71d, and 71e are stacked in order of increasing distance from each electrode terminal (sequentially from top). The block 60 includes one positive electrode lead-stacked part 66 and one negative electrode lead-stacked part 67. The block 70 includes one positive electrode lead-stacked part 76 and one negative electrode lead-stacked part 77. Each lead stacked body includes the same number of electrode plate leads. The thickness of the electrode plate leads (positive electrode leads 64 and 74, negative electrode leads 65 and 75) is, for example, 20 µm or less and preferably 5 µm to 20 µm.

In FIG. 7, the block 60 includes five single plate cells 61, and the block 70 includes five single plate cells 71. However, the number of stacked single plate cells is not limited and may differ in each block. The number of stacked single plate cell 61 or 71 in the corresponding block 60 or 70 is, for example, 20 or more and preferably 20 to 70. In a suitable block, the number of stacked single plate cells is 20 or more, and the thickness of each electrode plate lead is 20 µm or less.

In the block 60, the positive electrode leads 64 in the positive electrode lead-stacked part 66 are electrically connected to one another in stacking order of the single plate cells 61; the negative electrode leads 65 in the negative electrode lead-stacked part 67 are electrically connected to one another in stacking order of the single plate cells 61. The connection state of the electrode plate leads in the block 70 is the same as that in the block 60. The blocks 60 and 70 each have a connection structure in which a plurality of single plate cells is connected to the electrode terminals in parallel via a plurality of electrode plate leads.

In the block 60, the positive electrode leads 64 extend from one side surface 68A of the body part 68, and the negative electrode leads 65 extend from the other side surface 68A of the body part 68. In other words, pairs of electrode plate leads extend in opposite directions. In the example illustrated in FIG. 6, the positive electrode leads 64 and the negative electrode leads 65 (lead stacked parts) are disposed on the corresponding one end side of the stacked electrode body 58 in the width direction. The electrode plate leads of the block 70 also extend in opposite directions. The positive electrode leads 74 and the negative electrode leads 75 (lead stacked parts) are disposed on the corresponding other end side of the stacked electrode body 58 in the width direction. In other words, in each of the blocks 60 and 70, pairs of electrode plate leads (a pair of lead stacked parts) are arranged in the longitudinal direction of the stacked electrode body 58, the positive electrode leads 64 are out of alignment with the positive electrode leads 74 in the width direction of the stacked electrode body 58, and the negative electrode leads 65 are out of alignment with the negative electrode leads 75 in the width direction of the stacked electrode body 58.

The negative electrode leads 65 and 75 (the negative electrode lead-stacked parts 67 and 77) may overlap each other in the vertical direction but, as described below in detail, the positive electrode leads 64 and 74 (the positive electrode lead-stacked parts 66 and 76) do not overlap each other in the vertical direction.

The battery 50 includes a positive electrode terminal 80 to which the positive electrode lead-stacked parts 66 and 76 are connected, and a negative electrode terminal 81 to which the negative electrode lead-stacked parts 67 and 77 are connected. In other words, a plurality of lead stacked parts is connected to each electrode terminal. In the structure illustrated in FIG. 6 and FIG. 7, the positive electrode terminal 80 and the negative electrode terminal 81 extend from the corresponding ends of the outer body 51 in the longitudinal direction. A pair of electrode terminals extend in opposite directions as in the case of the battery 10. The positive electrode terminal 80 and the negative electrode terminal 81 are each bonded to the laminate films 52 and 53 at the seal part 56, pass through the seal part 56, and extend outward of the outer body 51 from between the films.

The positive electrode terminal 80 and the negative electrode terminal 81 each have, for example, a substantially flat plate shape and extend substantially perpendicular to the single plate cell-stacking direction α. The positive electrode terminal 80 and the negative electrode terminal 81 are each disposed at a substantially equal distance from the blocks 60 and 70 and respectively have first surfaces 80A and 81A and second surfaces 80B and 81B that are pairs of lead connection surfaces substantially perpendicular to the single plate cell-stacking direction α. Here, the first surfaces 80A and 81A are lead connection surfaces that face the block 60 (face upward), and the second surfaces 80B and 81B are lead connection surfaces that face the block 70 (face downward).

The blocks 60 and 70 are stacked on top of each other while the positive electrode lead-stacked parts 66 and 76 face in the same direction and the negative electrode lead-stacked parts 67 and 77 face in the same direction as described above. The negative electrode lead-stacked part 67 is connected to the first surface 81A, which is the lead connection surface of the negative electrode terminal 81 nearer to the block 60. The positive electrode lead-stacked part 66 is connected to the second surface 80B, which is the lead connection surface of the positive electrode terminal 80 farther from the block 60. The negative electrode lead-stacked part 77 is connected to the second surface 81B, which is the lead connection surface of the negative electrode terminal 81 nearer to the block 70. The positive electrode lead-stacked part 76 is connected to the first surface 80A, which is the lead connection surface of the positive electrode terminal 80 farther from the block 70.

Among the positive electrode leads 64 that constitute the positive electrode lead-stacked part 66, a positive electrode lead 64e is directly connected to the second surface 80B of the positive electrode terminal 80. Among the positive electrode leads 74 that constitute the positive electrode lead-stacked part 76, a positive electrode lead 74e is directly connected to the first surface 80A of the positive electrode terminal 80. As illustrated in FIG. 7, the positive electrode leads 64 of the block 60 cross the positive electrode leads 74 of the block 70 in sectional view (side view). Since the positive electrode leads 64 are out of alignment with the positive electrode leads 74 in the width direction of the stacked electrode body 58, the positive electrode leads 64 are not in contact with the positive electrode leads 74. The negative electrode leads 65 and 75 may be electrode plate leads connected to the corresponding electrode terminals in a cross state in sectional view. In this case, the positive electrode leads 64 are connected to the first surface 80A of the positive electrode terminal 80, and the positive electrode leads 74 are connected to the second surface 80B. The electrode plate leads of one block do not overlap the electrode plate leads of the other block in the vertical direction to avoid mutual interference when the electrode plate leads of one block and the other block are connected to the electrode terminal in a cross state in sectional view.

In each block in the battery 50, as described above, the stacking order of the electrode plate leads with respect to the electrode terminal on the positive electrode side is also opposite to that on the negative electrode side. For example, for the single plate cell 61a of the block 60, a negative electrode lead 65a in the negative electrode lead-stacked part 67 is the closest to the negative electrode terminal 81 so that the connection distance therebetween is the shortest; a positive electrode lead 64a in the positive electrode lead-stacked part 66 is the farthest from the positive electrode terminal 80 so that the connection distance therebetween is the longest. The same holds for the single plate cell 71a of the block 70.

In this embodiment, the total number (m+n) of the number (m) of connection interfaces M between each positive electrode lead 64 and the positive electrode terminal 80 and the number (n) of connection interfaces N between each negative electrode lead 65 and the negative electrode terminal 81 is the same for each single plate cell 61 included in the block 60. The total number (m+n) is also the same for each single plate cell 71 in the block 70. In the example illustrated in FIG. 7, the total number (m+n) is 6 for each of the single plate cells 61 and 71 included in the blocks 60 and 70.

In FIG. 8, like FIG. 3, X denotes the connection resistance at each of the connection interfaces M and N. In addition, R denotes a single plate cell included in the block 60, and r denotes a single plate cell included in the block 70. Each block includes n single plate cells. The positive electrode leads of single plate cells R1 and r1 are directly connected to the positive electrode terminal; the negative electrode leads of single plate cells Rn and rn are directly connected to the negative electrode terminal.

As illustrated in FIG. 8, the number (m) of connection interfaces M of the single plate cell R1 of the block 60 is 1, and the connection resistance between the single plate cell R1 on the positive electrode side and the positive electrode terminal is X. There are n negative electrode leads between the negative electrode lead of the single plate cell R1 and the negative electrode terminal, and the connection resistance on the negative electrode side is nX. The sum of the connection resistance between the single plate cell R1 and the positive electrode terminal and the connection resistance between the single plate cell R1 and the negative electrode terminal is (n+1)X. For other single plate cells included in the block 60 and the single plate cells included in the block 70, the sum of the connection resistances between each single plate cell and the electrode terminals is (n+1)X. Therefore, according to the battery 50, the sum of the connection resistances between each single plate cell and the electrode terminals is the same for each of the single plate cells 61 and 71 included in the blocks 60 and 70, and variations in the utilization rate of the single plate cells 61 and 71 can be reduced to improve cycle characteristics.

Figure 9:
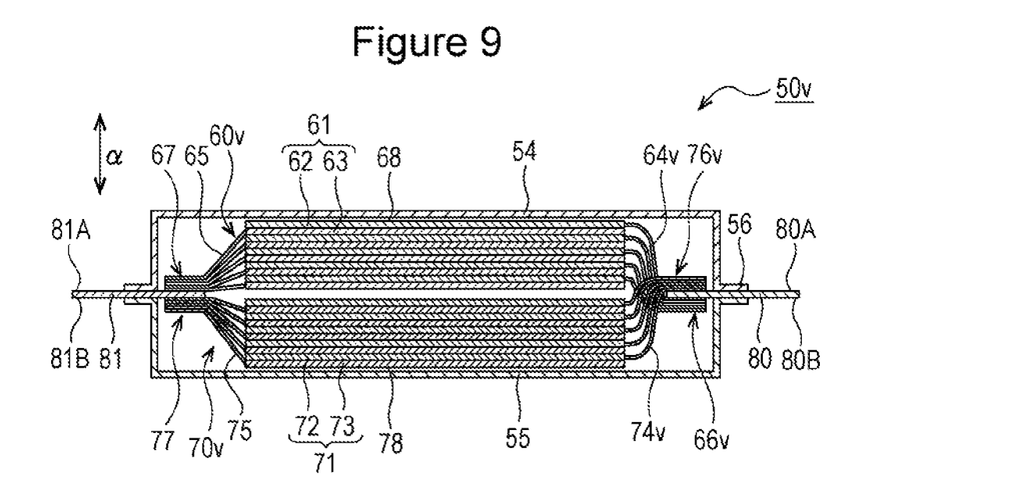
FIG. 9 is a sectional view of a battery according to a modification of the second embodiment.
Figure 12:
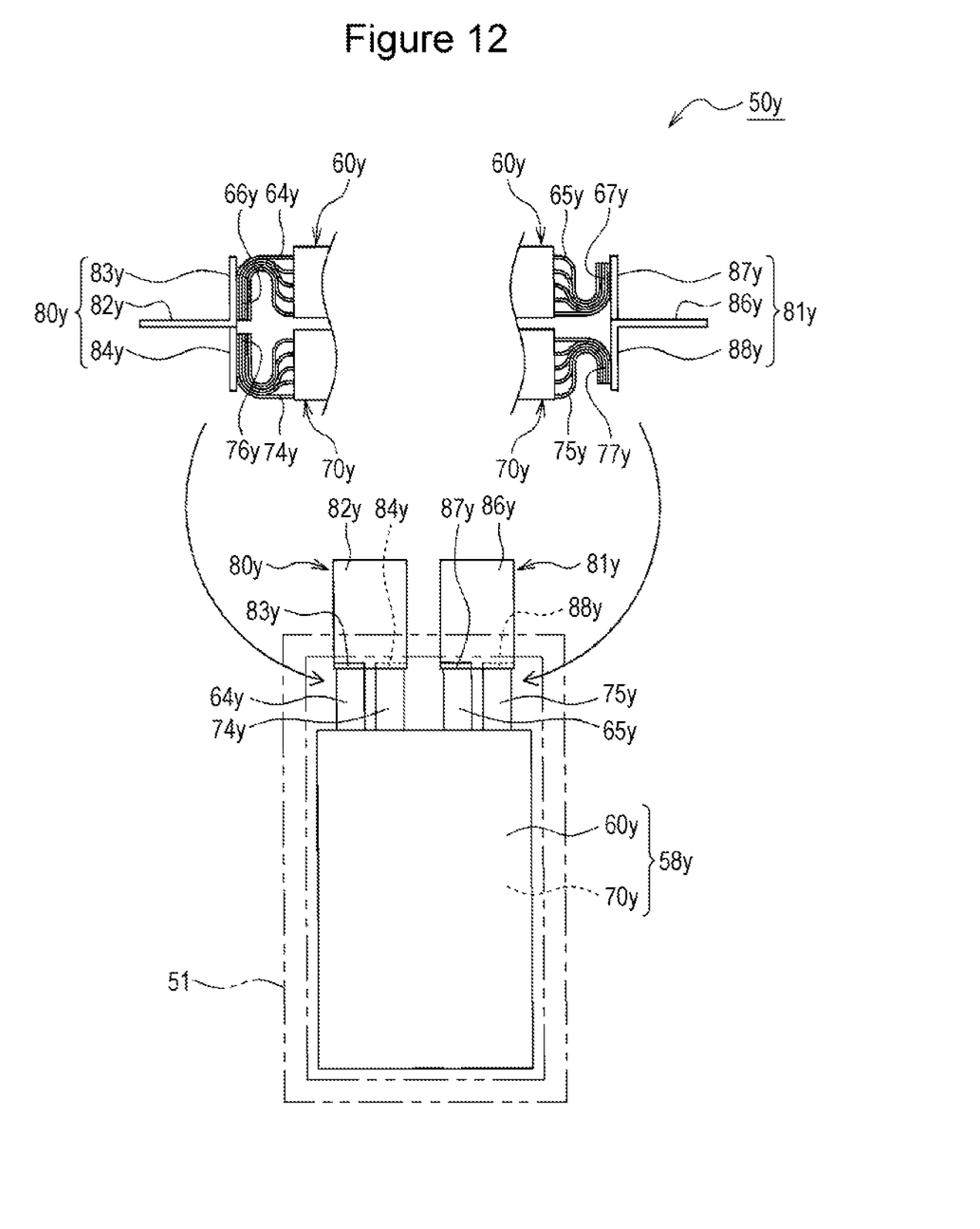
FIG. 12 is a plan view of a battery according to another modification of the second embodiment.

FIG. 9 and FIG. 12 illustrate batteries 50v, 50w, 50x, and 50y according to exemplary embodiments (modifications of the second embodiment).

FIG. 9 is a sectional view of the battery 50v. As illustrated in FIG. 9, the battery 50v differs from the battery 50 in that positive electrode leads 64v and 74v of blocks 60v and 70v are bent. In the battery 50, the positive electrode leads 64 and 74 extend substantially straight from their roots to the lead connection surface of the positive electrode terminal 80. The mixture layers of the single plate cells expand when the battery is repeatedly charged and discharged. Thus, stress is easily generated when the positive electrode leads are connected substantially straight to the positive electrode terminal and the positive electrode leads are connected to the farther lead connection surface for the positive electrode leads. Furthermore, the positive electrode leads 64 and 74 experience stress more easily than the negative electrode leads 65 and 75 since the positive electrode leads 64 and 74 are connected to the corresponding farther lead connection surfaces of the positive electrode terminal 80 in a state in which the positive electrode leads 64 cross the positive electrode leads 74 in sectional view. Therefore, the positive electrode leads 64v and 74v are preferably bent so as to deal with stress. The bent positive electrode leads 64v and 74v are more difficult to fracture than the positive electrode leads 64 and 74.

The positive electrode leads 64v and 74v are preferably curved gradually from their roots to the corresponding lead connection surfaces of the positive electrode terminal 80. The positive electrode leads 64v and 74v may be curved toward the body parts 68 and 78 or may be curved toward the opposite side (outward). The positive electrode leads 64v and 74v are bent in the example illustrated in FIG. 9, but the negative electrode leads 65 and 75 may be bent. When the negative electrode leads 65 and 75 are connected to the corresponding farther lead connection surfaces of the negative electrode terminal 81, at least the negative electrode leads 65 and 75 are preferably bent.

Figure 10:
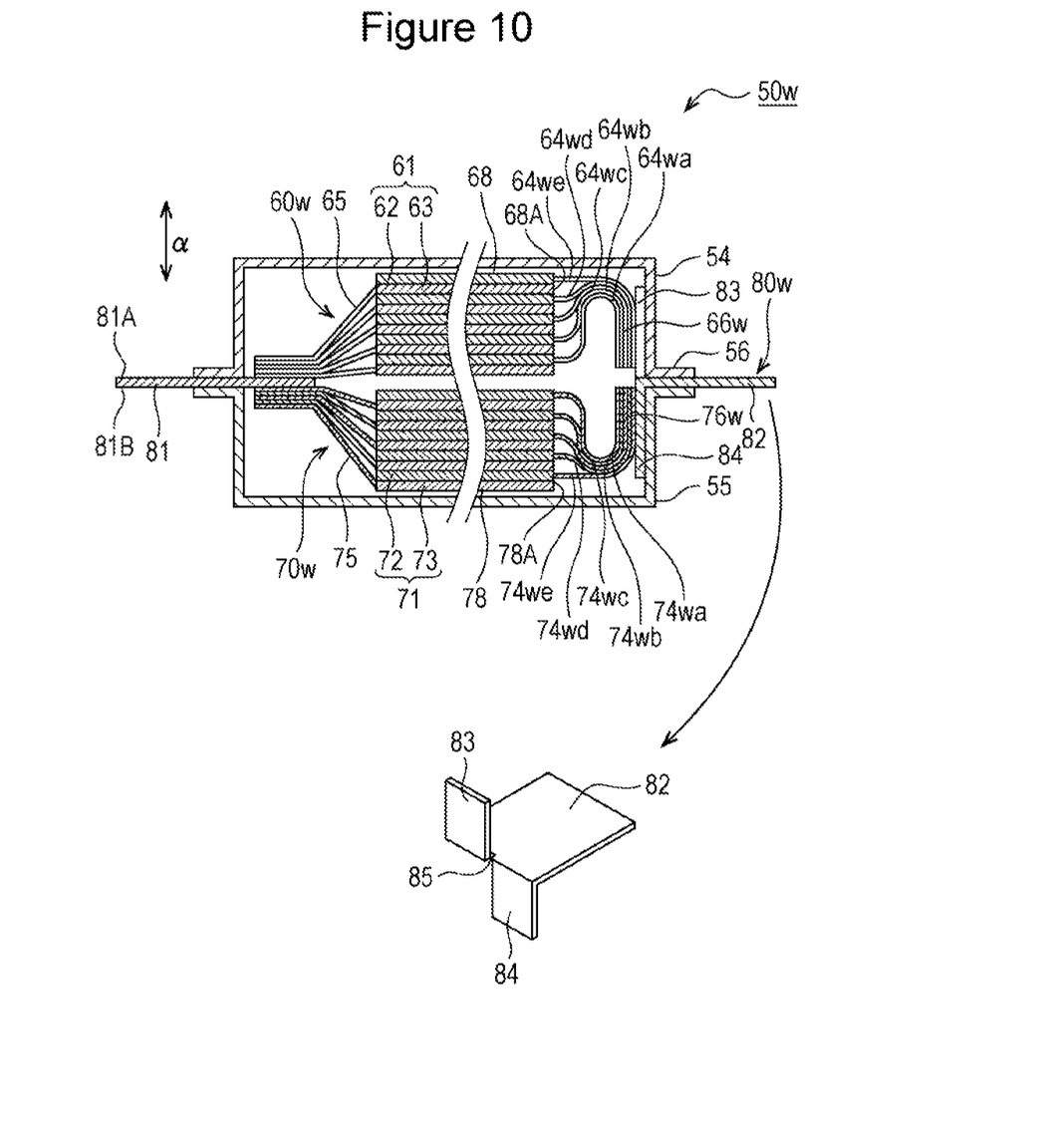
FIG. 10 is a sectional view of a battery according to another modification of the second embodiment.

FIG. 10 includes an enlarged sectional view of the electrode terminals of the battery 50w and its surroundings, and a perspective view of a positive electrode terminal 80w. As illustrated in FIG. 10, the battery 50w differs from the battery 50 in that the battery 50w has the positive electrode terminal 80w having a T-shape in sectional view instead of the positive electrode terminal 80 having a plate shape. Positive electrode leads 64wa to 64we of a block 60w each have a substantially U-shape protruding upward, and positive electrode leads 74wa to 74we of a block 70w each have a substantially U-shape protruding downward.

The positive electrode terminal 80w has a base part 82 substantially perpendicular to the single plate cell-stacking direction α and has two lead connection parts 83 and 84 (first and second lead connection parts) substantially perpendicular to the base part 82. The base part 82 passes through a seal part 56 and extends outward of an outer body 51 from between the films. The lead connection parts are disposed in the corresponding body parts 54 and 55. The lead connection part 83 extends on the body part 54 side (extends upward), and the positive electrode leads 64wa to 64we (positive electrode lead-stacked part 66w) of the block 60w are connected to this connection part. The lead connection part 84 extends on the body part 55 side (extends downward), and the positive electrode leads 74wa to 74we (positive electrode lead-stacked part 76w) of the block 70w are connected to this connection part. The lead connection parts 83 and 84 extend in opposite directions, and the lead connection parts and the base part 82 form a substantially T-shape in side view (as viewed in the width direction of the base part 82).

The positive electrode terminal 80w is formed by for example, making a cut 85 in one rectangular metal plate and bending the parts on both sides of the cut 85 in opposite directions. The lead connection parts 83 and 84 formed on both sides of the cut 85 stand at one edge of the base part 82 located in the body parts 54 and 55. The angle between the lead connection part 83 or 84 and the base part 82 is, for example, 80° to 100°, preferably 85° to 95°, and more preferably about 90°.

According to the battery 50w, the amount of wasted space in the battery can be reduced by connecting the positive electrode leads of the blocks 60w and 70w to the positive electrode terminal 80w in a state in which the positive electrode leads of the blocks 60w and 70w are bent in a substantially U-shape. Specifically, the space for the connection area between the positive electrode leads and the positive electrode terminal 80w, that is, the distance between the outer body 51 and side surfaces 68A and 78A of the body parts 68 and 78 can be made smaller than that in the case of the battery 50. This configuration allows the battery to have a small size and a high energy density.

Preferably, the positive electrode lead-stacked parts 66w and 76w are respectively connected to the surfaces of the lead connection parts 83 and 84 that face the body parts 68 and 78 in order to, for example, downsize the battery. Among the positive electrode leads 64wa to 64we that constitute the positive electrode lead-stacked part 66w, the positive electrode lead 64we is directly connected to the lead connection part 83. Among the positive electrode leads 74wa to 74we that constitute the positive electrode lead-stacked part 76w, the positive electrode lead 74we is directly connected to the lead connection part 84. The negative electrode leads 65a and 75a are directly connected to the negative electrode terminal 81. In the battery 50w, the stacking order of the electrode plate leads with respect to the electrode terminal on the positive electrode side is also opposite to that on the negative electrode side. This configuration can reduce variations in the utilization rate of the single plate cells and improve cycle characteristics.

Figure 11:
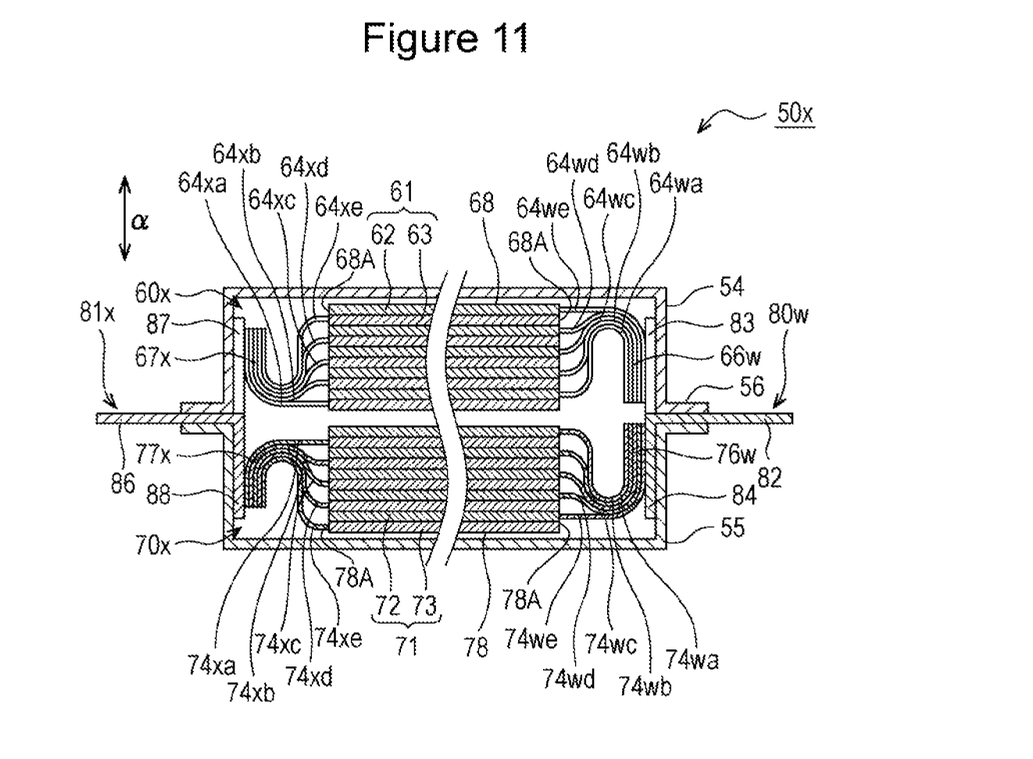
FIG. 11 is a sectional view of a battery according to another modification of the second embodiment.

FIG. 11 is an enlarged sectional view of the electrode terminals of the battery 50x and its surroundings. As illustrated in FIG. 11, the battery 50x differs from the battery 50w in that the battery 50x has a negative electrode terminal 81x having a T-shape in sectional view instead of the negative electrode terminal 81 having a plate shape. Like the positive electrode terminal 80w, the negative electrode terminal 81x has a base part 86 and two lead connection parts 87 and 88 substantially perpendicular to the base part 86. The lead connection parts 87 and 88 extend in opposite directions. The negative electrode terminal 81x may be the same as that used as the positive electrode terminal 80w.

Negative electrode leads 65xa to 65xe of a block 60x each have a substantially U-shape protruding downward, and negative electrode leads 75xa to 75xe of a block 70x each have a substantially U-shape protruding upward. The negative electrode leads 65xa and 75xa are directly connected to the lead connection parts 87 and 88 of the negative electrode terminal 81x as in the case of the battery 50w. In the battery 50x, the stacking order of the electrode plate leads with respect to the electrode terminal on the positive electrode side is also opposite to that on the negative electrode side.

The battery 50x has a smaller size and a higher energy density than those of the battery 50w when an electrode terminal having a substantially T-shape in side view is used for both the positive electrode and the negative electrode.

FIG. 12 is a plan view of the battery 50y, where an outer body 51 is indicated by a two-dot chain line. FIG. 12 includes side views of electrode terminals and its surroundings as viewed in the directions indicated by the arrows. As illustrated in FIG. 12, the battery 10y differs from the battery 50x in that the electrode plate leads (lead stacked parts) of blocks 60y and 70y extend outward in the same direction and a pair of electrode terminals extend from an outer body 51 in the same direction. The electrode plate leads (lead stacked parts) are arranged at one end portion of the stacked electrode body 58y in the longitudinal direction and distant from each other in the width direction of the electrode body. A positive electrode lead 64y, a positive electrode lead 74y, a negative electrode lead 65y, and a negative electrode lead 75y are arranged sequentially from one end side in the width direction.

A positive electrode terminal 80y is similar to a positive electrode terminal 80x in that the positive electrode terminal 80y has a base part 82y, lead connection parts 83y and 84y, and a T-shape in side view. A negative electrode terminal 81y is similar to a negative electrode terminal 81x in that the negative electrode terminal 81y has a base part 86y, lead connection parts 87y and 88y, and a T-shape in side view. The length of the positive electrode terminal 80y and the negative electrode terminal 81y in the width direction of the outer body 51 is, for example, equal to or shorter than half of the length of the positive electrode terminal 80x and the negative electrode terminal 81x. At one end portion of the outer body 51 in the longitudinal direction, the positive electrode terminal 80y extends from one end side of the outer body 51 in the width direction and the negative electrode terminal 81y extends from the other end side of the outer body 51 in the width direction while the positive electrode terminal 80y is distant from the negative electrode terminal 81y in the width direction such that these electrode terminals are not in contact with each other.

As in the case of the battery 50x, the positive electrode leads 64y of the block 60y and the negative electrode leads 75y of the block 70y each have a substantially U-shape protruding upward, and the positive electrode leads 74y of the block 70y and the negative electrode leads 65y of the block 60y each have a substantially U-shape protruding downward. The electrode plate leads directly connected to the corresponding lead connection parts of the positive electrode terminal 80y and the negative electrode terminal 81y are the same as those used in the battery 50x.

INDUSTRIAL APPLICABILITY

The present invention can be applied to batteries.

REFERENCE SIGNS LIST

10 Battery
11 Outer body
12, 13 Laminate film
14 Body part
15 Seal part
16 Positive electrode terminal
17 Negative electrode terminal
16A, 17A First surface
16B, 17B Second surface
20 Stacked electrode body
21 Single plate cell
22 Positive electrode 23 Negative electrode
24, 24a to 24e Positive electrode lead
25, 25a to 25e Negative electrode lead
26 Positive electrode lead-stacked part
27 Negative electrode lead-stacked part
28 Body part
28A Side surface
30, 32 Base part
31, 33 Lead connection part
31A, 33A First surface
31B, 33B Second surface
50 Battery
51 Outer body
52, 53 Laminate film
54, 55 Body part
56 Seal part
58 Stacked electrode body
60, 70 Block
61, 71 Single plate cell
62, 72 Positive electrode
63, 73 Negative electrode
64, 64a to 64e, 74, 74a to 74e Positive electrode lead
65, 65a to 65e, 75, 75a to 75e Negative electrode lead
66, 76 Positive electrode lead-stacked part, 67, 77 Negative electrode lead-stacked part
68, 78 Body part
68A, 78A Side surface
80 Positive electrode terminal
81 Negative electrode terminal
80A, 81A First surface
80B, 81B Second surface
82, 86 Base part
83, 84, 87, 88 Lead connection part
85 Cut
M, N Connection interface
α Single plate cell-stacking direction

The invention claimed is:

1. A battery comprising:
a stacked electrode body including a plurality of single plate cells and having a positive electrode lead-stacked part and a negative electrode lead-stacked part,
the plurality of single plate cells include a first single plate cell which has a first positive electrode plate and a first negative electrode plate, and a second single plate cell which has a second positive electrode plate and a second negative electrode wherein the first single plate cell is stacked on the second single plate cell,
the first single plate has a first positive electrode lead extending from the first positive electrode plate and a first negative electrode lead extending from the first negative electrode plate,
the second single plate has a second positive electrode lead extending from the second positive electrode plate and a second negative electrode lead extending from the second negative electrode plate,
the negative electrode lead-stacked part includes the first negative electrode lead and the second negative electrode lead stacked and joined together the positive electrode lead-stacked part being formed by stacking and joining the first positive electrode lead and the second positive electrode lead each other,
the negative electrode lead-stacked part being formed by stacking and joining the first negative electrode lead and the second negative electrode lead each other;
a positive electrode terminal to which the positive electrode lead-stacked part is connected; and
a negative electrode terminal to which the negative electrode lead-stacked part is connected,
wherein, a joining portion of the second positive electrode lead is located between a first positive electrode and the positive electrode terminal, and the positive electrode terminal is not disposed between the first positive electrode lead and the second positive electrode lead,
wherein, a joining portion of the first negative electrode lead is located between a second negative electrode and the negative electrode terminal and the negative electrode terminal is not disposed between the first negative electrode lead and the second negative electrode lead,
wherein a distal portion in the positive electrode lead-stacked part is folded and extended to a stacking direction of the stacked electrode body,
and wherein a distal portion in the negative electrode lead-stacked part is folded and extended to a stacking direction of the stacked electrode body,
wherein the distal portion in the positive electrode lead-stacked part and a distal portion in the negative electrode lead-stacked part are extending in opposite directions from each other in the stacking direction of the stacked electrode body,
wherein a surface of the distal portion in the positive electrode lead-stacked part which is opposite to a surface of the distal portion facing the single plate cells is joining to the positive electrode terminal,
wherein a surface of the distal portion in the negative electrode lead-stacked part which is opposite to a surface of the distal portion facing the single plate cells is joining to the positive electrode terminal.

* * * * *